(12) United States Patent
King

(10) Patent No.: US 10,413,068 B2
(45) Date of Patent: Sep. 17, 2019

(54) SHELF DIVIDER NETTING FOR USE IN FULFILLMENT CENTERS, WAREHOUSES AND DISTRIBUTION CENTERS

(71) Applicant: Warehouse Design, Inc., Thomasville, NC (US)

(72) Inventor: David Charles King, Thomasville, NC (US)

(73) Assignee: Warehouse Design, Inc., Thomasville, NC (US)

( * ) Notice: Subject to any disclaimer, the term of this patent is extended or adjusted under 35 U.S.C. 154(b) by 0 days.

(21) Appl. No.: 15/846,192

(22) Filed: Dec. 18, 2017

(65) Prior Publication Data

US 2018/0168346 A1   Jun. 21, 2018

Related U.S. Application Data

(60) Provisional application No. 62/435,632, filed on Dec. 16, 2016.

(51) Int. Cl.
*A47B 96/04* (2006.01)
*F16B 1/00* (2006.01)
*B65G 1/02* (2006.01)

(52) U.S. Cl.
CPC ............ *A47B 96/04* (2013.01); *B65G 1/02* (2013.01); *F16B 1/00* (2013.01); *B65G 2201/02* (2013.01); *F16B 2001/0028* (2013.01)

(58) Field of Classification Search
CPC ..... A47B 96/04; A47B 61/006; A47B 47/027; A47B 47/028; A47B 47/021; A47B 47/02; B65G 1/02; B65G 2201/02; A47G 5/00; F16B 1/00; F16B 2001/0028

USPC ............ 211/183, 192, 191, 184, 180, 41.9; 312/3–6; 182/138; 160/124, 222, 223, 160/84.06, 330

See application file for complete search history.

(56) References Cited

U.S. PATENT DOCUMENTS

| | | | | |
|---|---|---|---|---|
| 673,703 A * | 5/1901 | Davis et al. | ............... | B60P 7/06 160/113 |
| 844,687 A * | 2/1907 | Miller et al. | ............... | A47F 5/10 211/175 |
| 1,718,263 A * | 6/1929 | Summers | .................. | A47F 1/08 209/281 |
| 3,938,872 A * | 2/1976 | Hagerman | ............. | A47B 96/04 312/291 |
| 4,053,008 A * | 10/1977 | Baslow | .................... | B44C 7/022 160/327 |
| 4,800,947 A * | 1/1989 | Loomis | ............... | G09F 15/0025 160/368.1 |
| 4,852,194 A * | 8/1989 | Langan | ................. | A47D 15/005 5/427 |
| 4,981,225 A * | 1/1991 | Cole | ........................ | B65G 1/02 211/180 |
| 5,170,829 A * | 12/1992 | Duncan | .................... | B65G 1/02 160/194 |

(Continued)

*Primary Examiner* — Jennifer E. Novosad
(74) *Attorney, Agent, or Firm* — NK Patent Law

(57) ABSTRACT

A netting assembly for use in a fulfillment centers, warehouses and distribution centers includes a web of netting material, an attachment device at a top portion of the netting material for engaging a first rigid surface of the fulfillment center, and an anchoring device at a bottom portion of the netting material for engaging a second rigid surface of the fulfillment center.

8 Claims, 5 Drawing Sheets

(56) References Cited

U.S. PATENT DOCUMENTS

| | | | | |
|---|---|---|---|---|
| 5,573,125 A * | 11/1996 | Denny | A47B 96/00 | 160/84.01 |
| 5,601,198 A * | 2/1997 | Reed | A47B 96/02 | 211/180 |
| 5,791,501 A * | 8/1998 | Baldwin, Jr. | A47B 97/00 | 108/27 |
| D398,091 S * | 9/1998 | Badgett | D32/3 | |
| 5,984,121 A * | 11/1999 | Cole | B65G 1/02 | 211/183 |
| 6,026,886 A * | 2/2000 | Diamond-Martinez | E06B 3/685 | 160/113 |
| 6,068,085 A * | 5/2000 | Denny | A62B 1/22 | 182/138 |
| 6,098,750 A * | 8/2000 | Reynolds | A62B 1/22 | 182/112 |
| 6,123,294 A * | 9/2000 | Genovese | B64D 9/00 | 244/110 C |
| 6,585,122 B2 * | 7/2003 | Calleja | A47F 5/01 | 211/180 |
| 6,609,621 B2 * | 8/2003 | Denny | A47B 47/021 | 211/180 |
| 6,619,490 B2 * | 9/2003 | Calleja | A47F 5/01 | 211/180 |
| 6,722,512 B2 * | 4/2004 | Scully | A47F 5/13 | 211/175 |
| 6,837,388 B2 * | 1/2005 | Calleja | A47F 5/01 | 182/138 |
| 7,008,154 B1 * | 3/2006 | Nolle | B60R 7/005 | 410/118 |
| 7,014,053 B2 * | 3/2006 | Calleja | A47F 5/01 | 182/138 |
| 7,191,907 B2 * | 3/2007 | Conway | A47B 47/027 | 182/138 |
| 8,025,091 B2 * | 9/2011 | Kennelly | E04G 21/3204 | 160/327 |
| D646,065 S * | 10/2011 | White | D6/332 | |
| D667,246 S * | 9/2012 | Cittadino | D6/513 | |
| 8,398,184 B1 * | 3/2013 | Benneche | F25D 23/025 | 312/292 |
| 8,468,927 B2 * | 6/2013 | Malone | F41H 5/013 | 89/36.02 |
| 8,672,092 B2 * | 3/2014 | Black | A63J 3/00 | 182/150 |
| 8,863,671 B2 * | 10/2014 | Shaw | B65D 19/40 | 108/25 |
| 9,033,106 B2 * | 5/2015 | Blinn | E04G 21/3266 | 182/139 |
| 9,345,342 B1 * | 5/2016 | Nagy | A47B 96/00 | |
| 9,468,314 B2 * | 10/2016 | Goodwin | A47F 5/0838 | |
| 10,030,397 B2 * | 7/2018 | Stearns | A62B 1/22 | |
| 2001/0033084 A1 * | 10/2001 | Murray | B60J 1/2011 | 296/24.46 |
| 2004/0129660 A1 * | 7/2004 | Kita | A47B 81/06 | 211/180 |
| 2004/0182809 A1 * | 9/2004 | Calleja | A47F 5/132 | 211/180 |
| 2004/0211740 A1 * | 10/2004 | Denny | A47F 13/00 | 211/183 |
| 2005/0224436 A1 * | 10/2005 | Rosiello | B65G 1/02 | 211/180 |
| 2005/0263470 A1 * | 12/2005 | Homeland | A47B 47/021 | 211/183 |
| 2007/0187349 A1 * | 8/2007 | Calleja | A47B 47/021 | 211/189 |
| 2007/0278271 A1 * | 12/2007 | Koren | A45C 3/00 | 224/407 |
| 2010/0102015 A1 * | 4/2010 | Benneche | A47B 97/00 | 211/183 |
| 2013/0078049 A1 * | 3/2013 | Bistuer | B60P 7/0876 | 410/97 |
| 2013/0121785 A1 * | 5/2013 | Coury | B60P 7/06 | 410/97 |

* cited by examiner

SHELF DIVIDER NETTING FOR USE IN FULFILLMENT CENTERS, WAREHOUSES AND DISTRIBUTION CENTERS

CROSS-REFERENCE TO RELATED APPLICATIONS

This application claims priority to U.S. Provisional Patent Application No. 62/435,632 filed on Dec. 16, 2016, the entire contents of which are incorporated by reference herein.

TECHNICAL FIELD

The presently disclosed subject matter is directed towards a shelf divider netting for use in a fulfillment center, warehouses and distribution centers and, more particularly, for providing a flexible barrier to provide separation of packages within the storage system of fulfillment centers, warehouses and distribution centers while providing sufficient elasticity and conformability to prevent damage to packages when abutting or otherwise contacting the flexible netting.

BACKGROUND

Many fulfillment centers, warehouses and distribution centers include an array of scaffolding type structures to which containers and boxes of materials and products for fulfillment and distribution are provided. Current methods of producing a "separation" about the otherwise open scaffolding structure is to install a vertical rigid structure in both the transvers and longitudinal direction of the shelf. This disadvantageously creates a situation where a rigid metal structure with non-pliable and sometimes sharp grid wires can cause damage to packages, personnel, and other equipment. Additionally, the rigid metal structure is only positionable about a set height of the shelf, both transvers and longitudinal resulting in no vertical adjustment.

Accordingly, there remains a need for a device that addresses the various disadvantages associated with previous devices.

DETAILED DESCRIPTION

Figure 1:
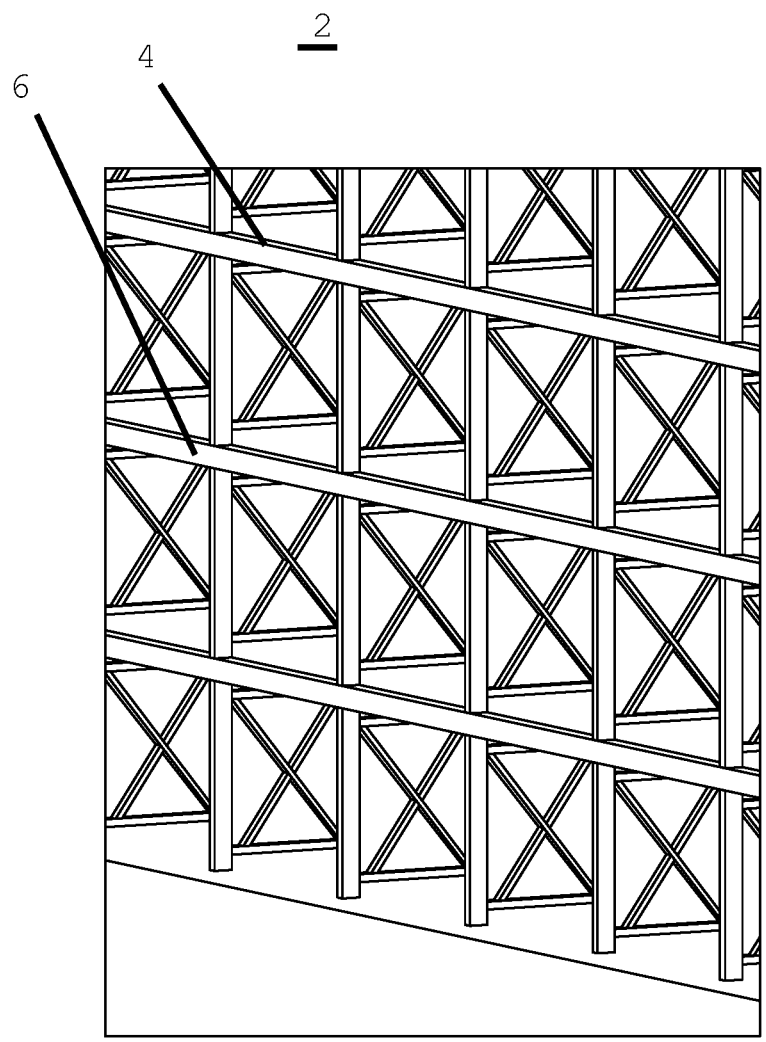
FIG. 1 illustrates a facility that may include a fulfillment center, warehouse, or distribution center.
Figure 2:
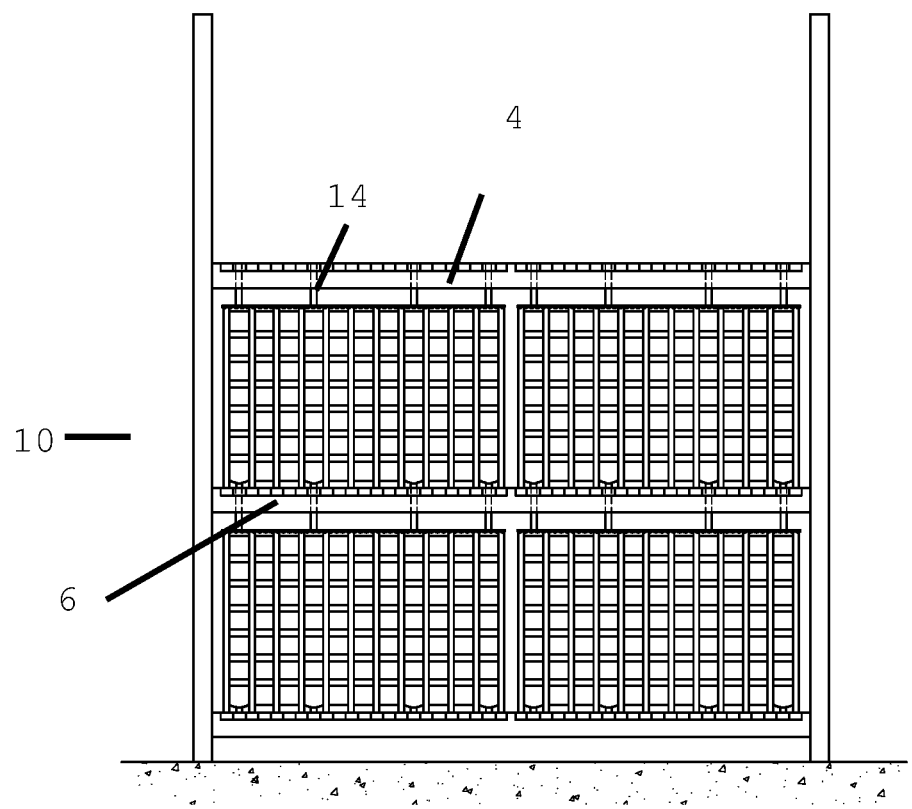
FIG. 2 illustrates a facility where a netting assembly has been installed for maintaining packages and parcels into position.

The presently disclosed subject matter now will be described more fully hereinafter with reference to the accompanying drawings, in which some, but not all embodiments are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

A netting assembly 10 for use in a facility 2 that is one of a fulfillment center, warehouse or distribution center is provided. The netting assembly 10 includes a web of netting material 12. The netting material 12 may be any appropriately configured netting material, including a sewn or stitched fabric, plastic or other polymer based, or other configuration. The netting material 12 may include a spacing between adjacent rows of netting elements, or the netting may be translucent or transparent. In one or more embodiments, the web of netting material 12 defines a periphery of seamed material that defines a major shape of the netting material. In one or more embodiments, the web of netting material 12 is formed of an industrial strength fabric.

An attachment device 14 is at a top portion of the netting material 12 for engaging a first rigid surface 4 of the facility 2. A rigid support 18 may extend along a length of a top facing surface at the top portion of the netting material for providing rigidity to the netting material 12. In this manner, the rigid support provides sufficient rigidity so that the netting material 12 keeps its shape and sufficiently covers the facility 2. The attachment device 14 may be a hook and loop fastener assembly. The attachment device 14 is a rigid hook that receives a wire frame or other structure of the fulfillment center.

An anchoring device 16 is at a bottom portion of the netting material 12 for engaging a second rigid surface 6 of the facility 2. The attachment device 14 is a hook and loop fastener assembly.

In operation, the netting assembly 10 is installed along a length or depth of a scaffolding or framing structure of the facility 2. The netting assembly 10 begins and terminates at a medial portion of a width or depth of the scaffolding or framing structure, to divide the scaffolding or framing structure along a length or depth thereof.

Accordingly, a shelf divider netting assembly for use in a fulfillment centers, warehouses and distribution centers is provided. The fulfillment center, warehouse or distribution center may be a packaging or package warehouse where online or other orders are placed and shipped from. An example of shelving for a fulfillment center is illustrated below:

The netting assembly may include a web of netting material. The web may have any appropriately configured grid or similar format. The web may be elastic in nature, or may be textile or fabric based. Additionally, the web may be formed from a polymer based material. The netting assembly is shown in the drawings provided herein. The web may be color coded or have other identifying indicia to help with sorting or arrangement.

An attachment device is at a top portion of the netting material for engaging a first rigid surface of the fulfillment center. The first surface may be a shelving of a scaffolding or package holding system. The scaffolding allows for a fulfillment center to alter the height of open space between adjacent levels of packaging surfaces. Since the net assembly 10 has some scalability with respect to height due to the anchoring and fastening systems employed, the net assembly disclosed herein may accommodate various sizes of packaging surfaces. Alternatively, netting assemblies of different dimensions may be provided. The netting assemblies may be engageable with each other to form an array of netting assemblies. Fasteners may be positioned on each end to attach adjacent netting assemblies in order to form the array thereof. An anchoring device is at a bottom portion of the netting material for engaging a second rigid surface of the fulfillment center.

Figure 3:
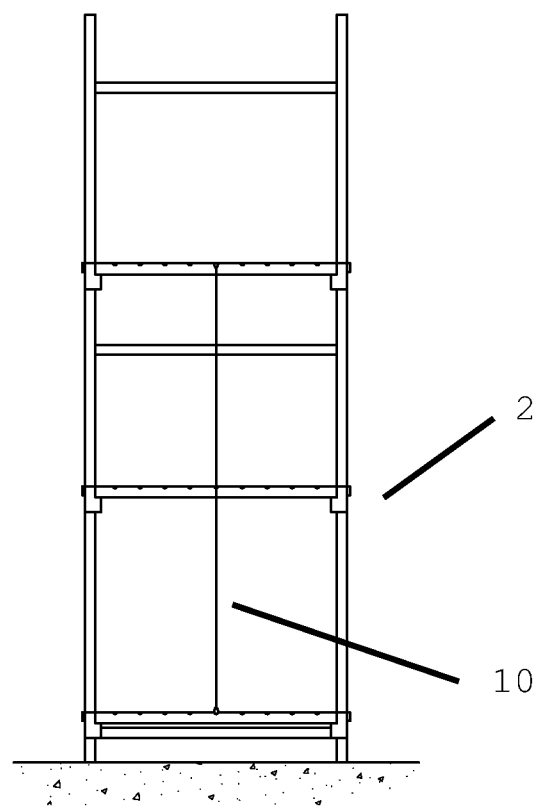
FIG. 3 illustrates an end view of a facility where the netting assembly described herein is positioned in a medial depth portion of a row of shelving.
Figure 4:
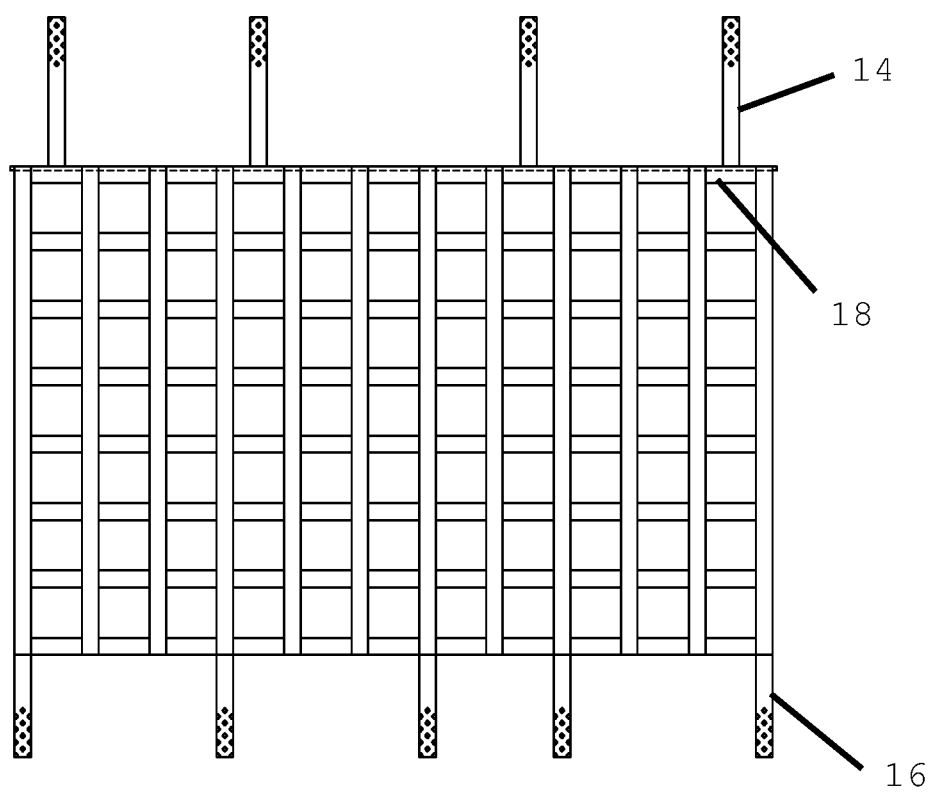
FIG. 4 illustrates a front view of a netting assembly.
Figure 5:
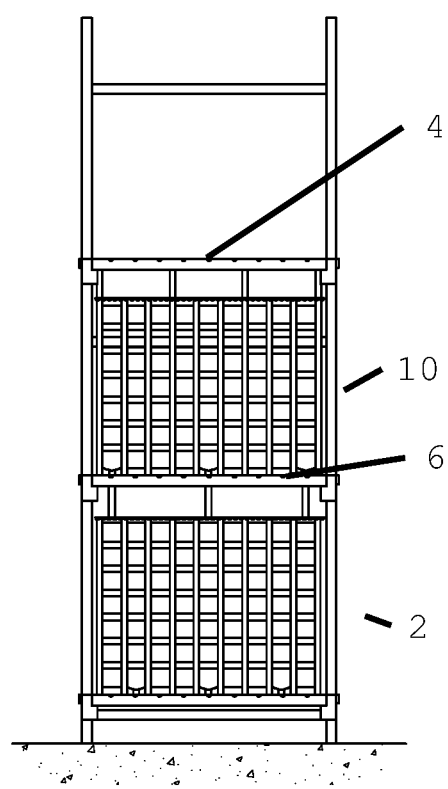
FIG. 5 illustrates an end view of a row in a facility where the netting assembly has been installed.

As illustrated in FIG. 3, the netting assembly 10 is able to be positioned in a medial depth of the shelving of the facility.

The web of netting material may define a periphery of seamed material that defines a major shape of the netting material. In this manner, the seamed material provides semi-rigidity and integrity of the shape of the netting material. In one or more embodiments, the web of netting material comprises an industrial strength fabric.

As illustrated in the drawings, a rigid support may extend along a length of a top facing surface at the top portion of the netting material for providing rigidity to the netting material. In certain designs the rigid support may be omitted. In one or more embodiments, the attachment device is a hook and loop fastener assembly such as Velcro®. In one or more embodiments, the attachment device is a rigid hook that receives a wire frame or other structure of the fulfillment center. In many applications, the shelving includes a wire frame that can advantageously receive a hook.

In operation, the netting assembly can be installed along a length or depth of a scaffolding or framing structure. In this manner, the netting assembly begins and terminates at a medial portion of a width of the scaffolding or framing structure, thus dividing the scaffolding or framing structure along a length or depth thereof. A hook and loop fastener may be employed along a bottom portion of the netting assembly.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
   providing a netting assembly for use in a facility including one of a fulfillment center, warehouse or distribution center, wherein the netting assembly begins and terminates at a medial portion of a width or depth of the scaffolding or framing structure,
   placing the netting assembly along a length or depth of a scaffolding or framing structure of the facility,
   wherein the netting assembly comprises a web of netting material, an attachment device at a top portion of the netting material for engaging a first rigid surface of the fulfillment center the attachment device comprising a first loop of material at a first end of the top portion that is looped around the first rigid surface and a second loop of material at a second end of the top portion that is looped around the first rigid surface such that the first and second loops are spaced-apart, and an anchoring device at a bottom portion of the netting material for engaging a second rigid surface of the fulfillment center, the anchoring device comprising a first loop of material at a first end of the bottom portion that is looped around the second rigid surface and a second loop of material at a second end of the bottom portion that is looped around the second rigid surface such that the first and second loops are spaced-apart, and a rigid support extending about the top portion between the first end and the second end thereof for providing rigidity to the netting material,
   wherein the method includes engaging the attachment device with the first rigid surface and engaging the anchoring device with the second rigid surface.

2. The method of claim 1, wherein the netting assembly is sized to cover an exposed portion of the scaffolding.

3. The method of claim 1, wherein the attachment device is a hook and loop fastener.

4. The method of claim 1, wherein the anchoring device is a hook and loop fastener.

5. The method of claim 1, wherein a rigid support extends along a length of a top facing surface at the top portion of the netting material for providing rigidity to the netting material.

6. A netting assembly for use in a fulfillment center, warehouse or distribution center, the netting assembly comprising:
   a web of netting material;
   an attachment device at a top portion of the netting material for engaging a first rigid surface of the fulfillment center, the attachment device comprising a first loop of material at a first end of the top portion that is looped around a horizontal surface of shelving and a second loop of material at a second end of the top portion that is looped around the horizontal surface of shelving;
   an anchoring device at a bottom portion of the netting material for engaging a second rigid surface of the fulfillment center, the anchoring device comprising a first loop of material at a first end of the bottom portion that is looped around a horizontal surface of shelving and a second loop of material at a second end of the bottom portion that is looped around the horizontal surface of shelving,
   a rigid support extending about the top portion between the first end and the second end thereof for providing rigidity to the netting material.

7. The netting assembly of claim 6, wherein the web of netting material defines a periphery of seamed material that defines a shape of the netting material.

8. The netting assembly of claim 6, wherein the netting assembly is installed along a length or depth of a scaffolding or framing structure, wherein the netting assembly begins and terminates at a medial portion of a width or depth of the scaffolding or framing structure, thus dividing the scaffolding or framing structure along a length or depth thereof.

* * * * *